United States Patent [19]

Taguchi

[11] Patent Number: 4,911,035
[45] Date of Patent: Mar. 27, 1990

[54] AIR BREATHER DEVICE OF AUTOMATIC TRANSMISSION

[75] Inventor: Hiromi Taguchi, Zama, Japan

[73] Assignee: Nissan Motor Co., Ltd., Yokohama, Japan

[21] Appl. No.: 176,016

[22] Filed: Mar. 31, 1988

[30] Foreign Application Priority Data

Mar. 31, 1987 [JP] Japan ................... 62-79331

[51] Int. Cl.⁴ .............................. F16H 57/04
[52] U.S. Cl. ................. 74/606 R; 74/606 A
[58] Field of Search ............... 74/600 R, 606 A, 607; 60/330, 336

[56] References Cited

U.S. PATENT DOCUMENTS

| | | | |
|---|---|---|---|
| 4,446,755 | 5/1984 | Takahashi | 74/606 R |
| 4,468,979 | 9/1984 | Inagaki et al. | 74/606 R |
| 4,554,844 | 11/1985 | Hamano | 74/606 R |
| 4,595,118 | 6/1986 | Azuma et al. | 74/606 R X |

*Primary Examiner*—Peter A. Aschenbrenner
*Attorney, Agent, or Firm*—Foley & Lardner, Schwartz, Jeffery, Schwaab, Mack, Blumenthal & Evans

[57] ABSTRACT

An air breather device of an automatic transmission is disclosed, which comprises a first recessed portion formed on a transmission housing near a mating edge portion of the same, and a second recessed portion formed on a converter housing near a mating edge portion of the same. Upon coupling of these housings with their mating edge portions sealingly mated, the first and second recessed portions are mated with each other to constitute a single air breather chamber having a sufficient capacity.

10 Claims, 4 Drawing Sheets

AIR BREATHER DEVICE OF AUTOMATIC TRANSMISSION

BACKGROUND OF THE INVENTION

1. Field of the Invention

The present invention relates to an air breather device of an automatic transmission for a motor vehicle.

2. Description of the Prior Art

In order to keep the inside pressure of the transmission at atmospheric level, a so-called air breather device is mounted to the transmission, which permits introduction of ambient air into the transmission or air discharge from the transmission into the open air in accordance with the pressure difference created between the inside of the transmission and the open air.

For clarification of the task of the present invention, one conventional air breather device for an automatic transmission will be outlined with reference to FIG. 6.

FIG. 6 shows a torque converter automatic transmission disclosed in "Toyota Service Manual for A-140E type automatic transmission" issued from Toyota Jidosha Co., Ltd. on August, 1982. In the drawing, numeral 1 denotes a transmission housing, and 2 denotes a converter housing. These housing 1 and 2 are integrally connected to form a monolithic construction as shown. Numeral 3 denotes a torque converter installed in the converter housing 2, and 4 denotes a transmission mechanism installed in the transmission housing 1. Denoted by numeral 5 is a reduction gear interposed between the transmission mechanism and a differential gear 6. Numeral 7 denotes an oil pump which is arranged between the torque converter 3 and the transmission mechanism 4. Numeral 8 denotes an air breather chamber formed above the oil pump 7, to which an air filter 9 is connected through a pipe.

However, because of its inherent construction, the transmission fails to provide the air breather chamber 8 with a sufficient capacity. As is known, when the capacity is insufficient, high load operation of the transmission sometimes induces that the lubricant oil in the transmission housing is blown off through the air filter 9.

SUMMARY OF THE INVENTION

It is therefore an object of the present invention to provide an air breather device of an automatic transmission, which is free of the above-mentioned drawback.

According to the present invention, there is provided an air breather chamber of sufficient capacity, which is automatically made up when a transmission housing and a converter housing are coupled with each other.

According to the present invention, there is provided an air breather device for use in a torque converter automatic transmission assembly including a transmission housing and a converter housing which are coupled with each other by sealingly contacting their respective mating edge portions, the transmission casing including a receptacle portion for installing therein a part of a differential gear. The air breather device comprises a first recessed portion formed on the transmission housing near the mating edge portion of the transmission housing; a second recessed portion formed on converter housing near the mating edge portion of the converter housing, the first and second recessed portions being sealingly mated to each other to constitute a single chamber upon coupling of the transmission housing and the converter housing; first means for fluidly connecting the interior of the transmission assembly to that of the single chamber; and second means for fluidly connecting the interior of the single chamber to the open air.

DETAILED DESCRIPTION OF THE INVENTION

Figure 1:
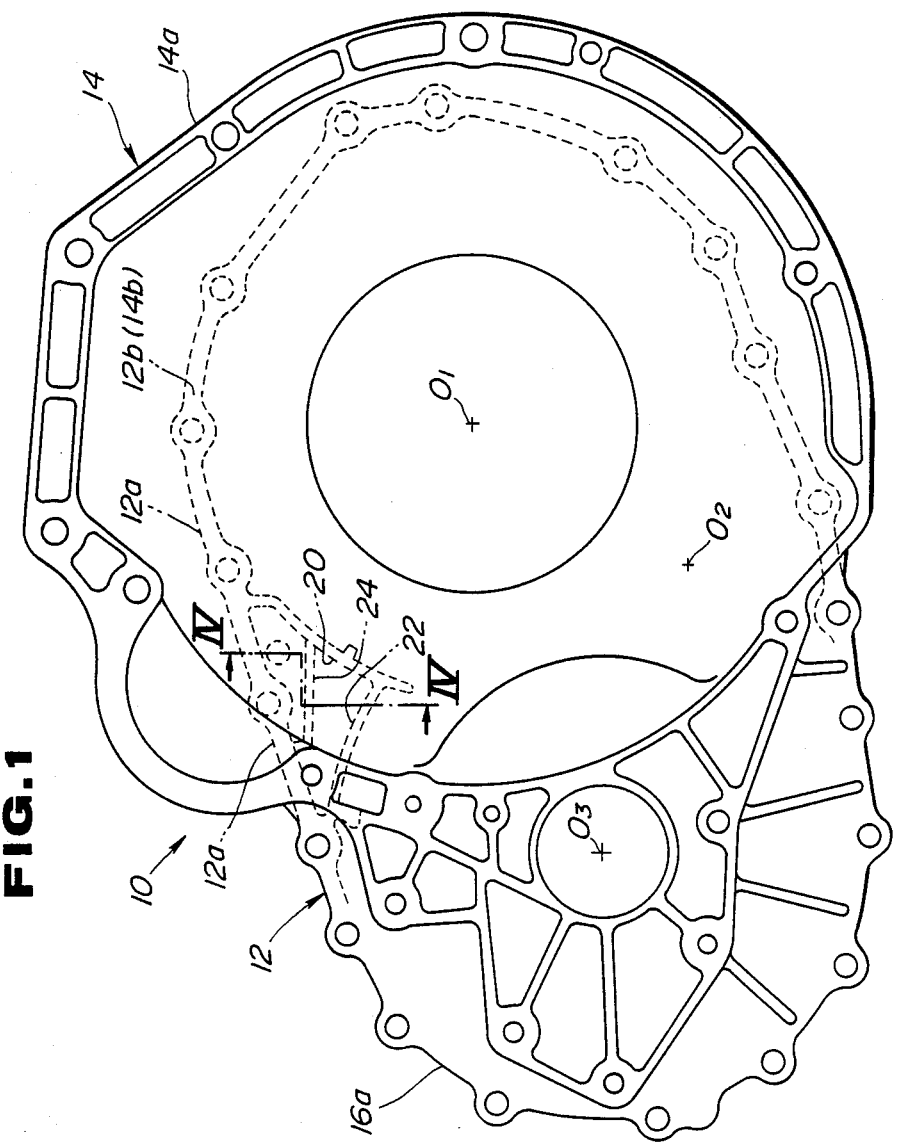
FIG. 1 is a front view of a torque converter automatic transmission to which an air breather device of the present invention is practically applied, showing a converter housing and a transmission housing.

Referring to FIGS. 1 to 5 of the drawings, particularly FIG. 1, there is shown an automatic transmission assembly 10 adapted for use in a F-F (viz., front engine front drive) type motor vehicle having an engine transversely mounted. The assembly 10 comprises a transmission 12 and a torque converter 14, each having a housing 12a or 14a for housing therein essential parts. The transmission housing 12a and the converter housing 14a are sealingly contacted at their mating edge portions 12b and 14b.

Figure 2:
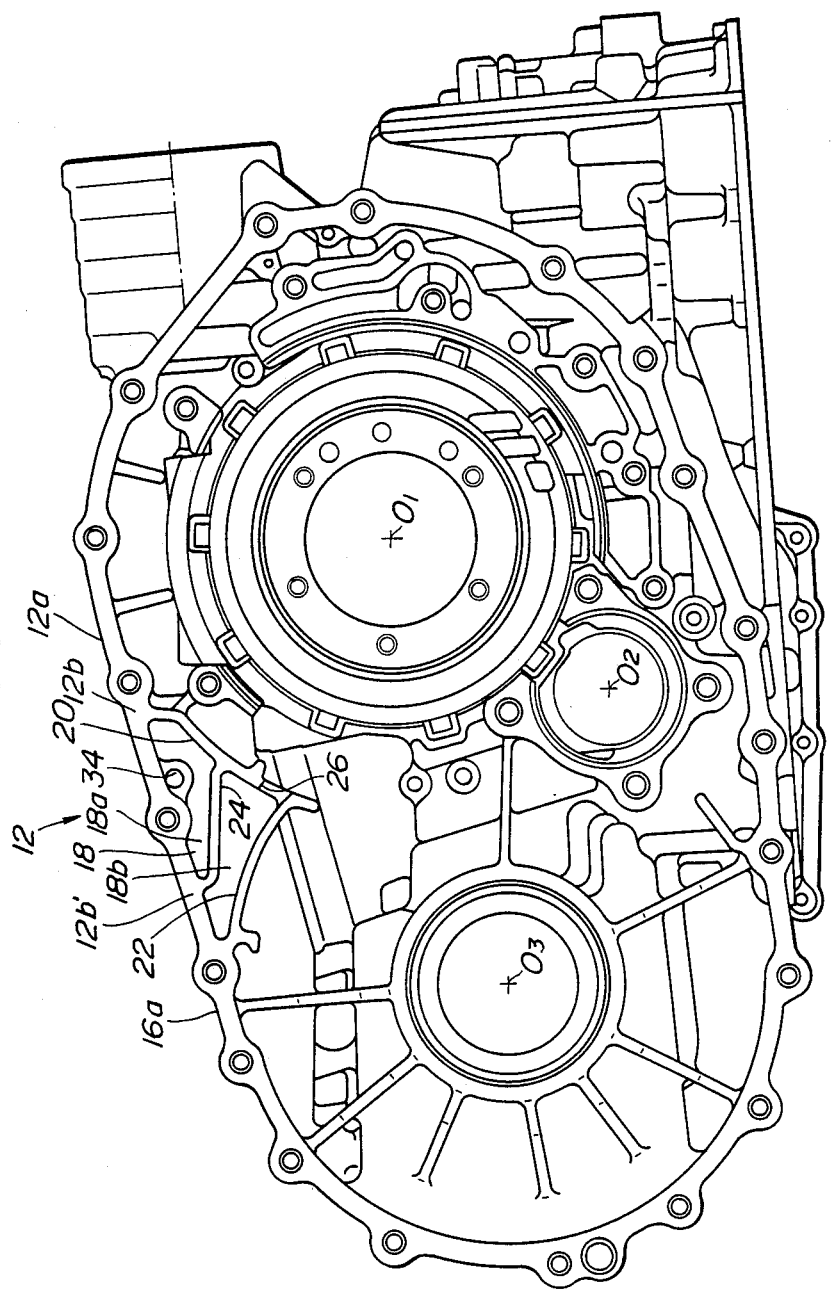
FIG. 2 is a front view of the transmission housing of the transmission.

As will be seen from FIG. 2, the transmission housing 12a is integrally formed with a receptacle portion 16a for installing therein a part of a differential gear (not shown). Thus, the transmission housing 12a covers both the transmission mechanism and the differential gear mechanism which constitute a transaxle.

Denoted by the reference $O_1$ is a center axis of the speed change mechanism consisting of the transmission 12 and the torque converter 14, denoted by the reference $O_2$ is a center axis of a reduction gear (not shown) and denoted by the reference $O_3$ is a center axis of the differential gear.

As will become apparent as the description proceeds, the air breather device of the present invention comprises first and second structures which are respectively formed on the transmission housing 12a and the converter housing 14a. That is, upon coupling of the housings 12a and 14a, the first and second structures are mated to each other to make up an air breather chamber of the air breather device.

As is seen from FIG. 2, the first structure comprises a recessed portion 18 which is defined by a first rib 20 forming a part of the transmission housing 12a, a second rib 22 forming a part of the receptacle portion 16a, and a part 12b of the mating edge portion 12b of the transmission housing 12a. Thus, the recessed portion 18 is generally triangular in shape, as shown. The recessed portion 18 is divided into first and second recesses 18a and 18b by a partition rib 24. The first, second and partition ribs 20, 22 and 24 have top surfaces which are flat and flush with the mating edge portion 12b of the transmission housing 12a therethroughout. The second rib 22 is formed at the second recess 18b with a cut 26 to form a short channel between the interior of the transmission housing 12a and the second recess 18b. As is seen from FIG. 4, a pipe 34 has one end exposed to the first recess 18a and the other end exposed to the open air. The other end is equipped with an air filter 36.

Figure 3:
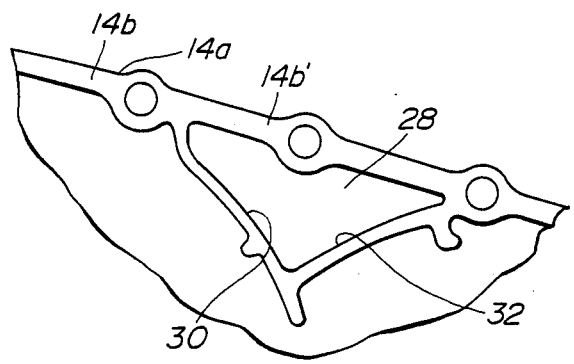
FIG. 3 is a partial view of a mating edge portion of the converter housing, to which a mating edge portion of the transmission housing is sealingly contacted.

As is seen from FIG. 3, the second structure comprises a recessed portion 28 which has a reversed form with respect to the above-mentioned recessed portion 18 and is formed on the converter housing 14a at a portion which is to be mated with the above-mentioned recessed portion 18 upon coupling of the two housings 14a and 12a. That is, the recessed portion 28 is defined by a third rib 30 integral with the converter housing 14a, a fourth rib 32 integral with the converter housing 14a and a part 14b' of the mating edge portion 14b of the converter housing 14a. Similar to those of the above-stated recessed portion 18, the third and fourth ribs 30 and 32 have top surfaces which are flat and flush with the mating edge portion 14b of the converter housing 14a therethroughout.

Figure 4:
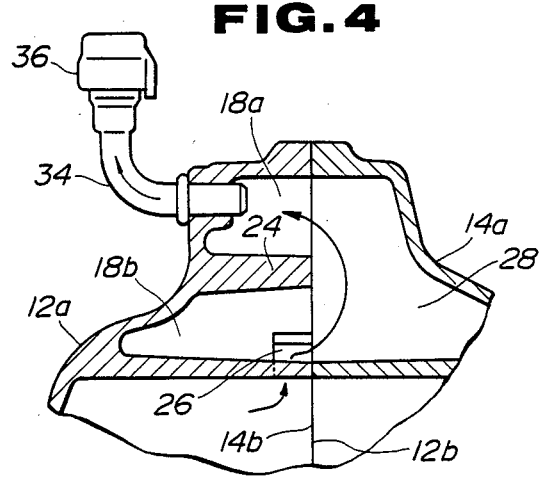
FIG. 4 is a sectional view taken along the line IV—IV of FIG. 1.

Upon coupling of the two housings 12a and 14a, the recessed portions 18 and 28 of them are mated with each other to constitute an air breather chamber, as is seen from FIG. 4.

The arrows shown in this drawing show the flow of air from the interior of the transmission assembly 10 to the open air. During this air flowing, any lubricant oil contained in the air is trapped in the air breather chamber. Due to the provision of the partition rib 24, the oil trapping is effectively carried out. Due to the provision of the air filter 36, air flowing from the open air into the transmission assembly 10 is carried out without contaminating the interior of the assembly 10 with foreign things or dust.

Figure 5:
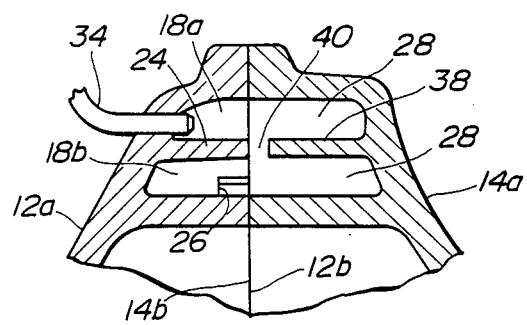
FIG. 5 is a sectional view similar to FIG. 4, but showing a modification of the present invention.
Figure 6:
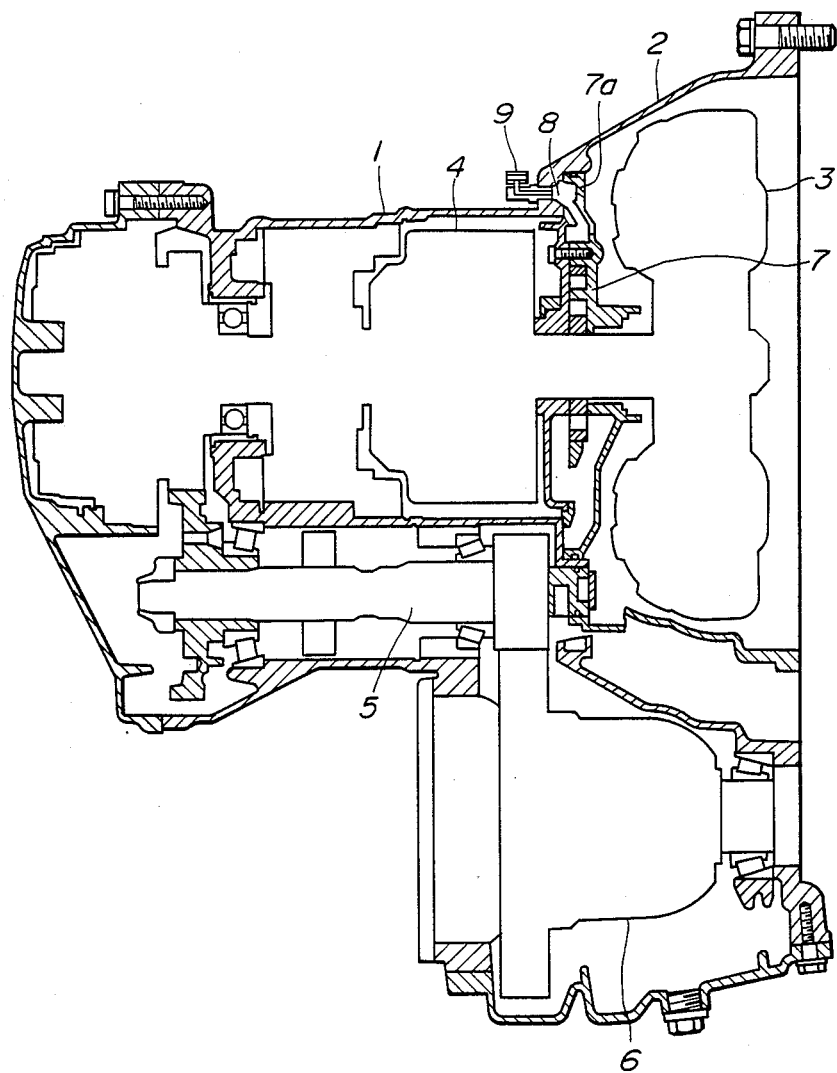
FIG. 6 is a longitudinal sectional view of a conventional automatic transmission.

If desired, a partition rib 38 may be arranged in the recessed portion 28 of the converter housing 14a, as shown in FIG. 5. The partition rib 38 extends toward the partition rib 24 of the transmission housing 12a with a certain space 40 therebetween. In this modification, the oil trapping is much more effectively carried out due to the labyrinth structure in the air breather chamber.

As will be understood from the foregoing description, since the mating edge portions of the transmission housing 12a and the converter housing 14a are effectively used, it is possible to provide the air breather chamber with a sufficient space or capacity.

Furthermore, since the air breather chamber is automatically made up upon coupling of the two housings 12a and 14a, the formation of the air breather chamber does not affect the assembling procedure of the transmission assembly.

What is claimed is:

1. In a torque converter automatic transmission assembly including a transmission housing and a converter housing which are coupled with each other by sealingly contacting their respective mating edge portions, said transmission casing including a receptacle portion for installing therein a part of a differential gear, an air breather device comprising:

a first recessed portion formed on said transmission housing near the mating edge portion of the transmission housing;

a second recessed portion formed on said converter housing near the mating edge portion of the converter housing, said first and second recessed portions being sealingly mated to each other to constitute a single chamber upon coupling of said transmission housing and said converter housing;

first means for fluidly connecting the interior of the transmission assembly to that of the single chamber; and second means for fluidly connecting the interior of the single chamber to the open air.

2. An air breather device as claimed in claim 1, in which said first recessed portion is defined by a first rib forming a part of the transmission housing, a second rib forming a part of the receptacle portion and a part of the mating edge portion of the transmission housing, and in which said second recessed portion is defined by a third rib integral with the converter housing, a fourth rib integral with the converter housing and a part of the mating edge portion of the converter housing.

3. An air breather device as claimed in claim 2, in which said first and second ribs have top surfaces which are flat and flush with the mating edge portion of said transmission housing, and in which said third and fourth ribs have top surfaces which are flat and flush with the mating edge portion of the converter housing.

4. An air breather device as claimed in claim 3, in which said first recessed portion is divided into two recesses by a partition rib which is integral with the transmission housing.

5. An air breather device as claimed in claim 4, in which said partition rib has a top surface which is flat and flush with the mating edge portion of the transmission housing.

6. An air breather device as claimed in claim 5, in which said second recessed portion is divided into two recesses by a partition rib which is integral with the converter housing.

7. An air breather device as claimed in claim 6, in which said partition rib of the converter housing is so sized and constructed as to leave a certain space between the respective partition ribs of the first and second recessed portions.

8. An air breather device as claimed in 7, in which said single chamber has a generally triangular section when viewed from a direction perpendicular to the center axis of the transmission assembly.

9. An air breather device as claimed in claim 8, in which said first means comprises a cut formed in said first rib, said cut being exposed to one of the two recesses of the first recessed portion.

10. An air breather device as claimed in claim 9, in which said second means comprises:

a pipe having one end exposed to the other recess of the first recessed portion; and an air filter connected to the other end of said pipe.

* * * * *